Dec. 25, 1951     W. E. RENICK     2,580,127
PRESSURE RELIEF VALVE MEANS
Filed Sept. 14, 1944
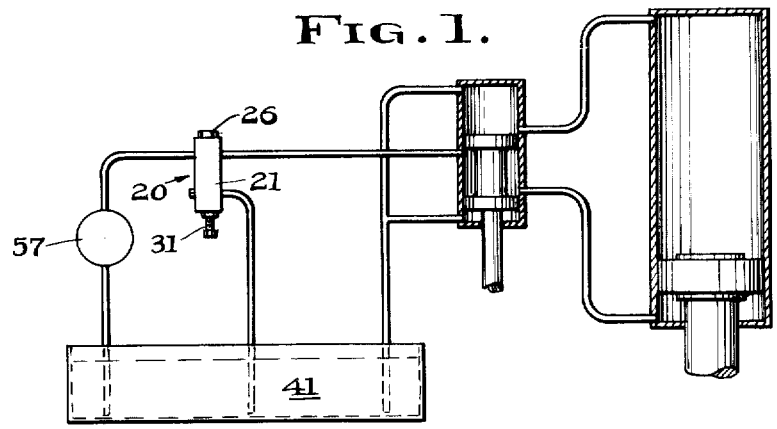
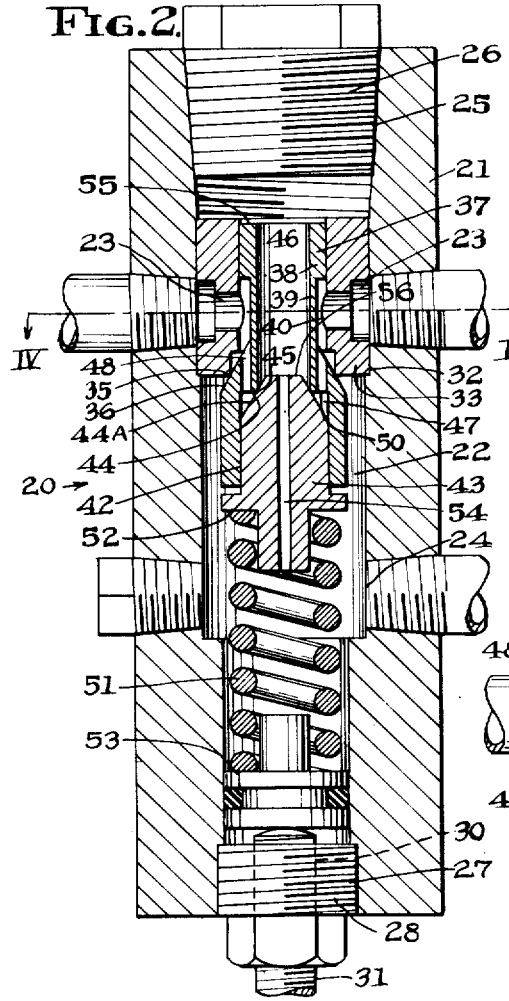
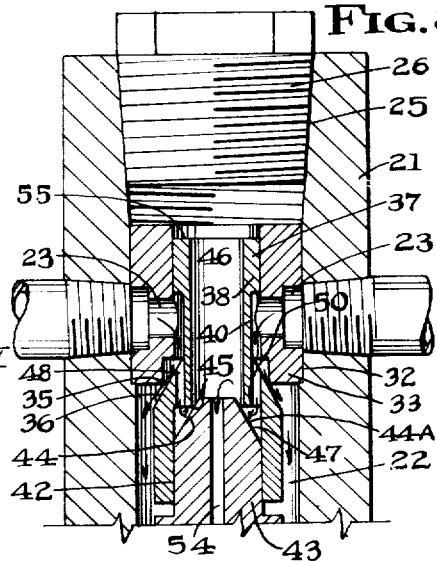
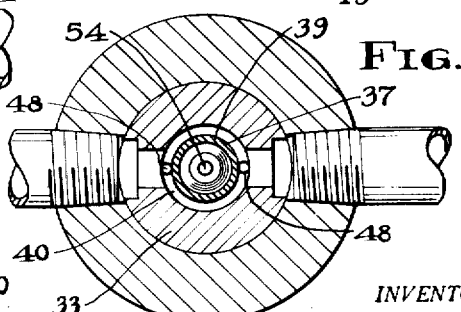
INVENTOR.
WENDELL E. RENICK
BY
Herschel C. Omohundro
His Attorney Patented Dec. 25, 1951

2,580,127

UNITED STATES PATENT OFFICE 2,580,127

PRESSURE RELIEF VALVE MEANS

Wendell E. Renick, Columbus, Ohio, assignor to The Denison Engineering Company, Columbus, Ohio, a corporation of Ohio Application September 14, 1944, Serial No. 554,018

7 Claims. (Cl. 137—153)

This invention relates to the science of hydraulics and is particularly directed to apparatus employed in the regulation of pressure in a hydraulic system.

An object of this invention is to provide a pressure relief device having a plurality of valve elements which are so formed and associated with one another that one valve will be employed to control the operation of a second valve, the first valve being governed by a sensitive force whereby the variations from a desired pressure will be maintained within a narrow margin.

A further object of the invention is to provide a pressure responsive relief device having a plurality of valve elements biased toward closed positions by resilient means, one of the elements also being biased toward a closed position by fluid pressure while another valve is closed and during a portion of the opening movement thereof whereby the force to be opposed by the resilient means will be reduced permitting the use of weaker resilient means thus increasing the sensitivity of the device.

An object of the invention, also, is to provide a relief valve having a pair of valve elements movable between open and closed positions and so related that when one of the valves is closed the other will be urged toward a closed position by fluid pressure, both valves having primary portions exposed to fluid pressure tending to open the same and secondary areas exposed to similarly acting pressures when the first valve is open, the total force applied to the primary and secondary areas of the second valve being sufficient, when the first valve is opened a predetermined extent, to overcome the force of the fluid pressure tending to close the second valve.

Another object of the invention is to provide a relief device having a pair of valve elements so related that when the valves are closed, each will have an area exposed to fluid pressure tending to open the same and one of the valves will also have an area so disposed that fluid pressure will tend to close this valve, this area being greater than the area first mentioned so that that valve will normally remain closed. However, when the other valve is opened due to increased fluid pressure, the areas on both valves exposed to fluid pressure tending to open them will be increased causing the valve first opened to open wider and the other valve to be biased toward open position with the result that this valve will suddenly open to provide for the flow necessary to reduce the pressure.

An object also resides in providing a pressure relief device having a pair of valves arranged in tandem, one valve being urged toward a closed position by a spring and transmitting this motion in turn to the other valve, the second also being biased toward closed position by fluid pressure until the first valve is opened sufficiently wide, the valves being of such size ratio that only a light spring force, compared to spring forces in conventional valves of similar capacity, will be necessary to hold the first valve closed until the required pressure is reached after which both valves will open to effect pressure relief.

Another object is to provide a pressure relief valve having a casing with a seat engaged by a hollow spool valve also having a seat which is engaged by a poppet valve, a spring being provided to push the poppet toward its seat, the poppet in turn pushing the spool toward the first seat, a fluid passage being formed in the spool to connect the inlet of the casing with the space between the seat in the spool and the poppet whereby the latter will be subjected to fluid pressure tending to open the same and the spool will be exposed to fluid pressure tending to hold it closed, the opening of the poppet serving to admit fluid pressure to areas on both valves whereby these members will tend to move away from the seats, the poppet having a passage which controls the building of fluid pressure on such areas.

Further objects and advantages of the present invention will be apparent from the following description, reference being had to the accompanying drawing wherein a preferred form of embodiment of the invention is clearly shown.

In the drawings:

Fig. 1 is a diagrammatic view of a hydraulic system in which the pressure relief mechanism forming the subject matter of this invention may be incorporated.

Fig. 2 is a vertical longitudinal sectional view of the relief device shown in the system in Figure 1.

Fig. 3 is a similar view showing the internal parts of the device in a different position.

Fig. 4 is a detailed horizontal, sectional view taken on the plane indicated by the line IV—IV of Fig. 2.

Referring more particularly to the drawing, the pressure relief device is indicated generally by the numeral 20. The device includes a body 21 which, in this instance, is of cylindrical form and includes a longitudinally extending chamber 22 and plurality of inlet ports 23 and outlet ports 24, these ports being connected by the internal chamber in the body. One end of the chamber is threaded as at 25 to receive a tapered plug 26, this plug closing the end of chamber 22 at one end of the body. The opposite end of the chamber is also threaded as at 27 to receive a second plug 29 which has an internally threaded opening 30 extending there-through. This threaded opening receives an adjusting screw 31, the purpose of which will be hereinafter set forth.

Adjacent the inlet openings 23 the chamber 22 is counter-bored as at 32 to receive a liner 33, this member also being of cylindrical form and having transverse ports which register with the inlet ports when the liner is properly positioned. The end of this liner has a seat 35 formed therein for engagement by an inclined shoulder 36 formed on a sleeve valve 37. This valve is supported by a guide 38 at the end of the sleeve for sliding movement in the liner 33. The sleeve valve is provided between the shoulder 35 and the guide 38 with an annular reduced portion 39 which provides a groove 40 in communication with the lateral ports in the liner, thus when the sleeve valve is disposed with the inclined shoulder in engagement with the seat 35, the groove 40 will provide a chamber for the reception of fluid under high pressure. The sleeve valve serves when properly seated to separate this high pressure chamber from the lower portion of the chamber 22 which is connected by the outlet ports 24 and one or more conduits, with a tank 41. Under this arrangement, the lower portion of the chamber 22 will contain fluid at zero or low pressure.

As illustrated in Figure 2 or 3, the upper portion of the sleeve valve is smaller in diameter than the inclined shoulder portion 36 so that the portion of this inclined shoulder which projects beyond the periphery of the guide section 38 and is surrounded by the seat 35 provides an unbalanced section which is exposed to high pressure fluid and tends to move the sleeve valve toward an open position. Since the inclined shoulder extends outwardly beyond the rest of the body of the sleeve, the lower portion thereof has a larger diameter. This portion is counter-bored as at 42 to slidably receive a poppet valve 43. This poppet valve has a beveled upper end 44, which engages a valve seat 45 formed in the sleeve valve. Due to the engagement of the surface 44 with the seat 45, the interior of the sleeve will be divided into intermediate and high pressure zones 46 and 47 respectively; the latter zone being located between the surface 44 and the inner wall of the counter-bored portion 42 of the sleeve. This high pressure section is connected with the high pressure section 40 by a plurality of openings 48 formed in the sleeve valve.

When both sleeve and poppet valves are in engagement with their respective seats fluid under high pressure will be contained in the sections 46 and 47. Since the sleeve has a shoulder 50 exposed to the pressure in the section 47 which shoulder faces in the direction of closing movement of the sleeve, this pressure will tend to move the sleeve toward a closed position. The area of this shoulder is greater than the unbalanced area of the sleeve which is exposed to high pressure tending to move the valve toward an open position, thus when the poppet valve is closed to confine all fluid in section 47, fluid pressure in this section will hold the sleeve in a closed position.

When the pressure in the high pressure section of the hydraulic system in which the valve is connected is below a pre-determined value, the poppet valve 43 will be maintained in a seated condition by a coil spring 51 which surrounds the reduced lower end of the poppet valve and has one end in engagement with a shoulder 52 formed on the poppet valve. The opposite end of this spring engages an abutment 53 adjustably positioned in the lower end of the chamber 22. The tension of the spring may be varied by moving the abutment 53 longitudinally in the chamber 22 through the adjustment of screw 31. This screw is adjusted in the operation of setting the valve for a pre-determined pressure to be maintained in the high pressure section of the hydraulic system.

As illustrated in Figures 2 to 4 inclusive, the poppet valve is provided with a longitudinally extending bore 54 which has a cross sectional area less than the sum of the cross sectional areas of the openings 48. The passage 54 establishes restricted communication between the intermediate pressure section or zone 46 and the low pressure zone 22. It will be seen from the foregoing that when poppet valve 43 is in contact with its seat 45, fluid flow from the high pressure section 47 into the intermediate pressure section 46 will be precluded and since the passage 54 connects the intermediate pressure zone 46 with the low pressure zone 22, the fluid in the intermediate pressure zone will be at the same pressure as the fluid in the low pressure zone. The upper end surface of the sleeve valve, hereafter referred to as the secondary area 55 of the sleeve valve, and the surface of the poppet valve within the valve seat 44, hereafter termed the secondary area 56 of the poppet valve, are exposed to fluid under either no pressure or very low pressure. The spring 51 can therefore hold the poppet valve in engagement with its respective seat and the sleeve valve in engagement with the seat 35, the force of the spring being transmitted to the sleeve through the poppet valve body.

In the operation of the device, the valve is set for the desired pressure, for example 1,000 p. s. i. through the adjustment of the screw 31. When the pump 57 supplies sufficient fluid to the system to raise the pressure to approximately that desired for example 980#, this pressure will also prevail in the section 47 and will exert a downward force on the primary area 44A of the poppet valve. This force will be sufficient to initially start compressing the spring 51 and permit the poppet valve to move slightly away from seat 45. The fluid will then be permitted to flow past this seat into the intermediate pressure section 48. This fluid can flow from the intermediate pressure section through the passage 54 to the chamber 22 and through the port 24 to the reservoir 41. As long as the passage 54 can conduct all the fluid flowing into the intermediate pressure section away from this section, no pressure will be built up therein. However, as the pump continues to supply fluid and the pressure continues to rise in the high pressure section of the system, more force will be applied to the poppet valve. The spring 51 will then be further compressed by the poppet valve opening to a greater extent. This opening will admit more fluid into the intermediate pressure section. When this inflow exceeds the capacity of passage 54, pressure will increase and be built up in the intermediate pressure zone and be exerted on the secondary areas of the sleeve and poppet valves. When the pressure in this intermediate pressure section reaches a sufficiently high value, said 425 p. s. i., the total force applied to the sleeve and poppet tending to move them toward the open position will be greater than the total force tending to hold these valves closed and they will therefore open, establishing direct connection between high pressure section 40 and low pressure section 22. When the pressure in the high pressure section of the system falls below the desired pressure, the spring will exert sufficient force to cause the valves to move toward closed positions. It will be understood, of course, that the sleeve valve will seat first since poppet valve 43 is designed to respond to a lower pressure.

From the foregoing it will be apparent that a pressure relief mechanism has been provided with a built-in pilot-type valve which permits the use of a relatively large main valve capable of quickly venting high pressure fluid. After once being opened, this main valve also quickly closes when the pressure is reduced thus, providing for sensitive pressure relief mechanism. It will also be seen that with the adjustment set forth, the main valve will be held in closed position by fluid pressure when the pilot valve is closed and will be opened by fluid pressure when this valve is opened wide enough for a predetermined pressure to be built up in the intermediate pressure zone. Since the capacity of the pilot-type of poppet valve is small a weaker spring can be employed and the device thus rendered highly sensitive.

In an actual test, the valve was designed for use in a one quarter inch pipe line. This valve contained a main seat with a diameter of .5386 inch for a sleeve valve which had a guide portion .5 inch in diameter thus providing a primary unbalanced area on the sleeve valve of .0386 square inch. The poppet valve body was .5 inch in diameter and engaged a seat having a diameter of .3125 inch leaving a primary pressure area on the poppet of .1196 square inch. As is apparent from the drawing the secondary area of the spool valve located at the upper end thereof is equal to the primary pressure area of the poppet or .1196 square inch. Since the diameter of the seat for the poppet was .3125 inch, the secondary area of the poppet was .0767 sq. inch. In this test valve the spring was set to exert 115 lbs. resistance to opening movement of the valve. The spool valve contained two one-sixteenth inch passages leading to the high pressure zone 47 while the poppet had one five-sixty-fourth inch passage leading from the intermediate pressure zone. It was found, after repeated tests, that the poppet valve started to open when the line pressure reached 980 p. s. i. As the pressure developed by the pump approached 1000 p. s. i. the pressure in the intermediate pressure zone increased to 425 p. s. i. and the main valve then opened thus preventing further increase in line pressure.

While the form of embodiment of the present invention as herein disclosed constitutes a preferred form, it is to be understood that other forms might be adopted, all coming within the scope of the claims which follow:

I claim:

1. A relief valve comprising a body having inlet and outlet ports connected by an internal passage; a seat in said passage between said ports and dividing the passage into high and low pressure sections; a valve member slidably disposed in said passage for engagement with said seat to control fluid flow between said sections, said member also having an internal passage; a seat dividing the second internal passage into high and intermediate pressure sections, said member having restricted passage means connecting the high pressure sections of said first and second internal passages; a second valve member slidably disposed in said second internal passage for engagement with said second seat to control communication between the high and intermediate pressure sections, said second valve member having constantly open restricted passage means connecting the intermediate pressure section and the low pressure section of said first passage; both of said valve members having areas exposed to pressure existing in said intermediate pressure sections and tending to open said valves; and spring means tending to urge said valve members toward said seats.

2. In a hydraulic system, pressure relief means connected between high and low pressure sections of said system, said means having a pair of valve members with areas exposed to fluid under high pressure, such pressure tending to open the first of said valves and close the second; resilient means tending to urge the first of said valve members toward a closed position, the closing force applied to said valve by said resilient means being transmitted thereby to the other valve to also tend the same toward a closed position, said first valve being opened by predetermined fluid pressure, opening movement of said first valve serving to increase the area thereof exposed to fluid pressure tending to effect opening movement thereof.

3. A relief valve comprising a body having a chamber with inlet and outlet ports spaced longitudinally thereof; a valve seat in said chamber between said inlet and outlet ports; a tubular valve element guided for longitudinal movement in said chamber to cooperate with said seat, said valve element having a valve seat formed therein; a second valve element slidably received by said tubular valve element for engagement with said second-mentioned seat, said valve elements forming high and intermediate pressure zones; passage means in the tubular valve element connecting the high pressure zone with said inlet port, additional passage means connecting the intermediate pressure zone with said outlet port, said first valve having an area exposed to pressure in said high pressure zone which tends to close said first valve, said second valve having an area exposed to pressure in said high pressure zone which tends to open said second valve, both of said valves having areas exposed to pressure in said intermediate pressure zone which tends to open said valves, opening movement of said second valve serving to admit pressure from the high to the intermediate pressure zone to increase the force tending to move said valves toward open position; and resilient means urging said first and second valve elements toward said first and second seats respectively.

4. A relief valve comprising a body having a chamber with inlet and outlet ports spaced longitudinally thereof; a valve seat in said chamber between said inlet and outlet ports; telescoping inner and outer valve elements guided for movement in said chamber to cooperate with said seat; a second valve seat formed in said outer valve element for engagement by said inner valve element, said elements and said chamber forming high and intermediate pressure zones, said outer valve element having passage means connecting said high pressure zone and said inlet port, said outer valve element also having substantially equal oppositely facing areas exposed to the high and intermediate pressure zones, respectively, said inner valve element having areas facing in the same direction exposed to high and intermediate pressure zones and a passage connecting said intermediate pressure zone and said outlet port; and resilient means tending to urge said valve elements toward said seats.

5. A relief valve comprising a body with a chamber and inlet and outlet ports communicating therewith; a valve seat in said chamber between said inlet and outlet ports; a spool-like valve element disposed in said chamber for movement toward and away from said valve seat; an internal valve seat provided in said valve element, said valve element forming passages establishing communication between the inlet sides of both seats; a tapered poppet valve guided for movement in said valve element toward and away from the internal seat therein, said poppet valve having a restricted passage therethrough; and spring means tending to urge said poppet valve into engagement with said internal seat.

6. A relief valve comprising a body with an internal bore and inlet and outlet ports communicating therewith; an internal valve-seat-forming shoulder provided in said bore between said inlet and outlet ports; a sleeve-like element disposed in said bore for sliding movement toward and away from said valve seat; an internal valve-seat-forming shoulder provided in said sleeve-like valve element, both of said shoulders facing in the same direction; and a spring-pressed tapered poppet valve guided in said sleeve-valve for movement toward and away from the second mentioned shoulder, said poppet valve having a restricted passage therethrough, said sleeve valve forming passages connecting the inlet side of said valve seats.

7. In a hydraulic system, pressure relief means formed for connection between high and low pressure sections of said system comprising a casing having an inlet and an outlet; a main valve seat in said casing between said inlet and outlet; a main valve movable in said casing to engage and be disengaged from said main seat; a secondary valve seat in said main valve; a secondary valve movable in said main valve to engage and be disengaged from said secondary valve seat; spring means between said casing and valves and tending to urge the latter toward their respective seats; surface areas on said valves exposed to inlet pressure when said valves engage their respective seats, the surface area on said main valve being arranged to cause said main valve to be urged toward a closed position by the inlet pressure, the surface area on said secondary valve being arranged to cause said secondary valve to be urged toward an open position, the opening of said secondary valve serving to increase the area of said secondary valve exposed to pressure tending to open said valve and expose a surface area of said main valve to pressure counteracting that tending to urge said main valve to a closed position.

WENDELL E. RENICK.

REFERENCES CITED

The following references are of record in the file of this patent:

UNITED STATES PATENTS

| Number | Name | Date |
|---|---|---|
| 120,958 | Garland | Nov. 14, 1871 |
| 235,748 | Crisp | Dec. 21, 1880 |
| 382,643 | Fox | May 8, 1888 |
| 1,355,149 | Kelly | Oct. 14, 1920 |
| 1,719,686 | Browne | July 2, 1929 |
| 1,934,758 | Temple | Nov. 14, 1933 |

FOREIGN PATENTS

| Number | Country | Date |
|---|---|---|
| 200,613 | Great Britain | July 19, 1923 |
| 540,596 | Great Britain | Oct. 23, 1941 |

Certificate of Correction

Patent No. 2,580,127                                            December 25, 1951

WENDELL E. RENICK

It is hereby certified that error appears in the printed specification of the above numbered patent requiring correction as follows:

Column 6, line 26, after "tend" insert *to urge*;

and that the said Letters Patent should be read as corrected above, so that the same may conform to the record of the case in the Patent Office.

Signed and sealed this 8th day of April, A. D. 1952.

[SEAL]

THOMAS F. MURPHY,
                                               *Assistant Commissioner of Patents.*